(12) United States Patent  (10) Patent No.: US 8,959,049 B2
Matsumoto  (45) Date of Patent: Feb. 17, 2015

(54) DOCUMENT PROCESSING DEVICE AND PROGRAM

(75) Inventor: Toshiko Matsumoto, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 13/696,881

(22) PCT Filed: Jun. 28, 2011

(86) PCT No.: PCT/JP2011/064749
§ 371 (c)(1),
(2), (4) Date: Nov. 8, 2012

(87) PCT Pub. No.: WO2012/002357
PCT Pub. Date: Jan. 5, 2012

(65) Prior Publication Data
US 2013/0091091 A1 Apr. 11, 2013

(30) Foreign Application Priority Data
Jun. 28, 2010 (JP) ................. 2010-146739

(51) Int. Cl.
*G06F 17/30* (2006.01)
*G06F 17/22* (2006.01)
*G06F 17/27* (2006.01)

(52) U.S. Cl.
CPC .............. *G06F 17/22* (2013.01); *G06F 17/277* (2013.01); *G06F 17/30011* (2013.01); *G06F 17/2294* (2013.01); *G06F 17/30616* (2013.01)
USPC ........................................................ 707/608

(58) Field of Classification Search
CPC .......... G06F 17/30985; G06F 17/2735; G06F 17/30657; G06F 17/30867; G06F 17/2755; G06F 17/289; G06F 17/30616; G06F 17/30731; G06F 17/30864; G06F 17/30; G06F 17/30289; G06F 17/30563; G06F 17/3064
USPC ........... 707/E17.014, 769, E17.044, E17.005, 707/E17.039, 780, 803, 602, 723, 740, 741, 707/E17.009, E17.017, E17.089, E17.108, 707/755, E17.002, E17.022, E17.032, 707/E17.033, E17.046, E17.069, E17.079, 707/661, 713, 722, 728, 736, 749, 758, 759, 707/765, 770, 781, 812, 827, 999.101; 704/9, 10, E11.001, 8, E13.005, 704/E15.014, E15.023, 2, 232, 240, 255, 704/260, 266, 7; 703/1; 709/217, 206, 204, 709/225; 382/177, 190, 131, 139, 175, 176, 382/321; 715/234, 256, 704, 716, 217, 227, 715/243, 702, 706, 736, 751, 764, 823
See application file for complete search history.

(56) References Cited

U.S. PATENT DOCUMENTS

| | | | |
|---|---|---|---|
| 4,850,025 A | * | 7/1989 | Abe .............................. 382/220 |
| 4,887,212 A | * | 12/1989 | Zamora et al. .................... 704/8 |

(Continued)

FOREIGN PATENT DOCUMENTS

| | | |
|---|---|---|
| JP | 3-209564 A | 9/1991 |
| JP | 6-348911 A | 12/1994 |

(Continued)

OTHER PUBLICATIONS

Katsuyama, Naoi, and Takebe, Automatic Keyword Extraction Methods for Business Documents, Fujitsu, 49, 5, pp. 404-409 (Sep. 1998).

(Continued)

*Primary Examiner* — Jay Morrison
*Assistant Examiner* — Ken Hoang
(74) *Attorney, Agent, or Firm* — Mattingly & Malur, PC

(57) ABSTRACT

A technique is provided in which, in a foreign language document in which a space character is provided for separation of words forming a document, it is possible to reliably detect each word separation and reliably reinsert a space character in the separation. It is decided whether adjacent characters are included in the same word (i.e., presence or absence of space) using: decision by an English writing rule, decision by information as to whether there is a space character in source document data; decision by the identification of character string objects including adjacent characters; and decision by a gap between the character string objects including the adjacent characters. It should be noted that it is preferable to make a decision by these processing in order of this description.

12 Claims, 12 Drawing Sheets

A

B

(56) References Cited

U.S. PATENT DOCUMENTS

| | | | |
|---|---|---|---|
| 4,914,704 A * | 4/1990 | Cole et al. | 704/235 |
| 4,991,094 A * | 2/1991 | Fagan et al. | 704/9 |
| 6,035,061 A | 3/2000 | Katsuyama et al. | |
| 6,546,401 B1 * | 4/2003 | Iizuka et al. | 1/1 |
| 6,721,451 B1 | 4/2004 | Ishitani | |

FOREIGN PATENT DOCUMENTS

| | | |
|---|---|---|
| JP | 9-237320 A | 9/1997 |
| JP | 11-184894 A | 7/1999 |
| JP | 3425408 B2 | 5/2003 |
| JP | 3425834 B2 | 5/2003 |

OTHER PUBLICATIONS

Ishitani, Y., Document Transformation System from Papers to XML Data Based on Pivot XML Document Method, Proceedings of the Seventh International Conference on Document Analysis and Recognition (2003).

* cited by examiner

Fig. 1
A
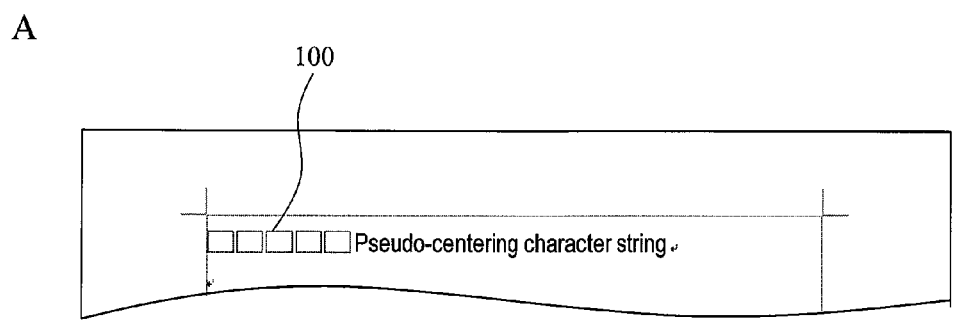
B
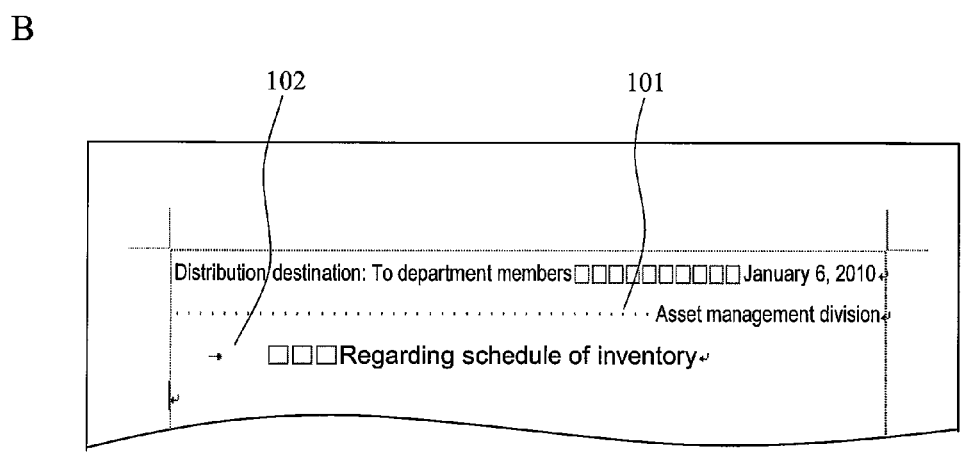

Fig. 2

Metadata extraction source document

```
To: ABC Co., Ltd.                    12/03/2010

This is a title

```

Extracted metadata

Title: Thisisatitle
   Destination: ABCCo.,Ltd.
   Creation date: 12/03/2010

Metadata extraction source document

This is a title

Word separation

B

Description content of metadata extraction source document

Font type setting: Serif
Font size setting: 10 points
Character gap setting: 15 points
Drawing position setting: (100, 250)
Character string drawing: "This"
Drawing position setting: (175, 250)
Character string drawing: "is"
Drawing position setting: (250, 250)
Character string drawing: "a"
⋮

Word separation

C

Metadata extraction source document

This is a title

Word separation

D

Metadata extraction source document

This is a title

Word separation

E

Word dictionary

| a | hop | soft |
| an | is | this |
| arrow | iterate | title |
| cat | key | tear |
| day | not | use |
| English | narrow | ... |

Fig. 6

Document information

| Member name | Value |
|---|---|
| Document ID | doc_0001 |
| Character data | [Character information] |
| Character string object data | [Character string object information] |
| Line drawing data | [Line drawing information] |
| Picture data | [Picture information] |

- 600: Document ID
- 601: Character data
- 602: Character string object data
- 603: Line drawing data
- 604: Picture data Character information

| Member name | Value |
|---|---|
| Character ID | char_0001 |
| Character code | "a" |
| Character string object ID | str_01 |
| Lower left coordinates | (500, 330) |
| Upper right coordinates | (510, 345) |
| Font size | 10.5 |
| Font type | Serif |

- 605: Character ID
- 606: Character code
- 607: Character string object ID
- 608: Lower left coordinates
- 609: Upper right coordinates
- 610: Font size
- 611: Font type Character string object information

| Member name | Value |
|---|---|
| Character string ID | str_0001 |
| Lower left coordinates | (500, 330) |
| Upper right coordinates | (580, 345) |

- 612: Character string ID
- 613: Lower left coordinates
- 614: Upper right coordinates

Fig. 7

Line drawing information

| Member name | Value |
|---|---|
| Line drawing ID | line_0001 |
| Starting coordinates | (100, 250) |
| Ending coordinates | (130, 250) |

700 — Line drawing ID
701 — Starting coordinates
702 — Ending coordinates

Picture information

| Member name | Value |
|---|---|
| Picture ID | img_0001 |
| Lower left coordinates | (400, 200) |
| Upper right coordinates | (500, 550) |
| Pixel data | Picture image |

703 — Picture ID
704 — Lower left coordinates
705 — Upper right coordinates
706 — Pixel data Metadata information

| Member name | Value |
|---|---|
| Metadata ID | meta_0001 |
| Metadata type | "Title" |
| Character data | [char_001, char_003, ...] |
| Space character reinsertion flag | [false, false, true, false, ...] |

707 — Metadata ID
708 — Metadata type
709 — Character data
710 — Space character reinsertion flag

DOCUMENT PROCESSING DEVICE AND PROGRAM

TECHNICAL FIELD

The present invention relates to a document processing device and program, and for example, relates to a technique of efficiently managing a large amount of file data of existing business documents.

BACKGROUND ART

Recently, a demand for a technique for efficiently dealing with documents in an organization has increased. For example, in line with the enforcement of the Japanese version of the Sarbanes-Oxley Act (Financial Instruments and Exchange Act), voucher management needs in business activities of companies have increased. Also, for example, intra-firm information, especially, (atypical) document data that is not stored in a relational database is rapidly increasing and a phenomenon called "information explosion" is occurring. In such a state, the needs for managing and searching documents by metadata such as the title, creation date and creator are also increasing. For example, in the case of business documents, if it is possible to perform search by an operational ID such as the document name, customer name, creation date and order number, it is possible to quickly find a document required in the audit of internal control. Also, in the case of design documents, if it is possible to perform search by the document name, creating department, creation date or product code, there is an advantage in effective utilization of technical information. Further, in the case of documents of complaint or failure information, if it is possible to perform search by the occurrence date, countermeasure date, product name, amount of damage or part name, there is an advantage in a prompt response at the time of occurrence of similar failure. Also, in the case of documents such as operating rules and notifications, if it is possible to perform search by the document type, creation date or implementation period, there is an advantage in effective job performance according to a rule.

Many techniques of analyzing atypical documents and automatically acquiring metadata are proposed (see the following Patent Literatures and Non-Patent Literatures). In these techniques, at the time of reading content described in a document, it is effective to perform processing in disregard of space characters. This is because it is possible to extract metadata without an influence of space characters to adjust character alignment. For example, as illustrated in FIG. 1A, space characters are inserted to realize the centering, or, as illustrated in FIG. 1B, space characters and a tab character are inserted to adjust the alignment. In FIGS. 1A and 1B, "□ (square)" as illustrated as reference numeral 100 indicates a double-byte space character, "● (dot)" as illustrated as reference numeral 101 indicates a one-byte space character, and "→ (arrow)" as illustrated in 102 indicates a tab character. In order to extract metadata without an influence of such space characters, it is effective to skip the space characters at the time of the reading of character data.

CITATION LIST

Patent Literature

Patent Literature 1: JP Patent Publication (Kokai) No. 11-184894A (1999)
Patent Literature 2: JP Patent No. 3425834
Patent Literature 3: JP Patent No. 3425408

Non Patent Literature

Non Patent Literature 1: Katsuyama, Naoi, and Takebe, Automatic Keyword Extraction Methods for Business Documents, FUJITSU, 49, 5, pp. 404-409 (September 1998)
Non Patent Literature 2: Ishitani, Y., Document Transformation System from Papers to XML Data Based on Pivot XML Document Method, Proceedings of the Seventh International Conference on Document Analysis and Recognition (2003)

SUMMARY OF INVENTION

Technical Problem

In the case of using an existing technique and extracting metadata from an English or other language document in which a space character is provided for each word separation, it is necessary to perform output in which a space character is inserted between words.

However, as described above, since a space character is skipped at the time of reading of character data, as illustrated in FIG. 2, the output is performed in a state where all words are connected. Unlike Japanese language, in the case of English language or the like, the output in which all words are connected significantly lacks the readability. As a solution to this, it is considered that, first, metadata is extracted in a state where words are connected, and after that, "word separation" is checked with reference to a metadata extraction source document (hereinafter, referred to as "source document") to reinsert a space character in the extracted metadata.

However, in the case of English or other language documents, it is difficult to reliably detect each word separation and reliably reinsert a space character.

The present invention is made in view of such a state and provides a technique of being able to reliably detect each word separation and reliably reinsert a space character in a document created by a language in which there is a space character in the separation of words forming a sentence.

Solution to Problem

To solve the above problem, the present invention provides a document processing device that performs predetermined processing on a document including text created in a language, in which a space character is provided as a word separation, and manages a processing result. In the document processing apparatus, it is decided (word separation decision processing) whether two adjacent characters included in the text are included in the same word, based on a writing rule between a character or a word and a symbol in the language. Subsequently, a processing result of the word separation decision processing is displayed on a displaying device and the processing result in a word separation decision processing unit is registered in a registration database in response to an input instruction.

Further, before the word separation decision processing, it performs processing of extracting metadata in disregard of space characters from text in a document database in which source document information acquired by reading a source document including words forming the text and information about presence or absence of a space character is stored. Subsequently, in the word separation decision processing, the space character is reinserted in the extracted metadata using a decision result as to whether the two adjacent characters are included in the same word, and the metadata in which the space character is reinserted, is registered in the registration database as a result of the word separation decision processing.

In the word separation decision processing, when it is not possible to determine by decision processing based on the writing rule that the two adjacent characters are included in the same word, the source document information is referred to in order to check whether a space character is inserted between the two adjacent characters, and based on the result of the check, it is decided whether the two adjacent characters in the text are included in the same word.

The document processing device according to the present invention stores, in a memory, object information including a character string identifier and a feature of a character string object, and character information indicating in which character string each character of a character string is included. Subsequently, in the word separation decision processing, when it is not possible to determine that the two adjacent characters are included in the same word even if the source document information is referred to, the character string object information and the character information are referred to in order to check whether the two adjacent characters are included in the same character string object, and based on the result of the check, it is decided whether the two adjacent characters in the text are included in the same word.

The character string object information further includes positional information of each character string. Subsequently, in the word separation decision processing unit, when it is not possible to determine that the two adjacent characters are included in the same word even if the character string object information and the character information are referred to, the positional information of each character string is referred to in order to check whether the character string objects have a gap or the character string objects are close to each other, and based on the result of the check, it is decided whether the two adjacent characters in the text are included in the same word.

Other features of the present invention will be clarified by the following embodiments of the present invention and the accompanying drawings.

Advantageous Effects of Invention

According to the present invention, at the time of extracting metadata from an atypical language (e.g., English) document, it is possible to perform output in which words are separated by a space character.

BRIEF DESCRIPTION OF DRAWINGS

FIG. 1 is a diagram illustrating an example of a document in which reading processing in disregard of space characters is adequate.

FIG. 2 is a diagram illustrating an example where an output is performed in a state where all words are connected, at the time of extracting metadata from an English document.

FIG. 3 is a diagram illustrating an intuitive method to check "word separation."

FIG. 6 is a diagram illustrating a data structure example of document information, character information and character string object information.

FIG. 7 is a diagram illustrating a data structure example of line drawing information, picture information and metadata information.

DESCRIPTION OF EMBODIMENTS

Figure 4:
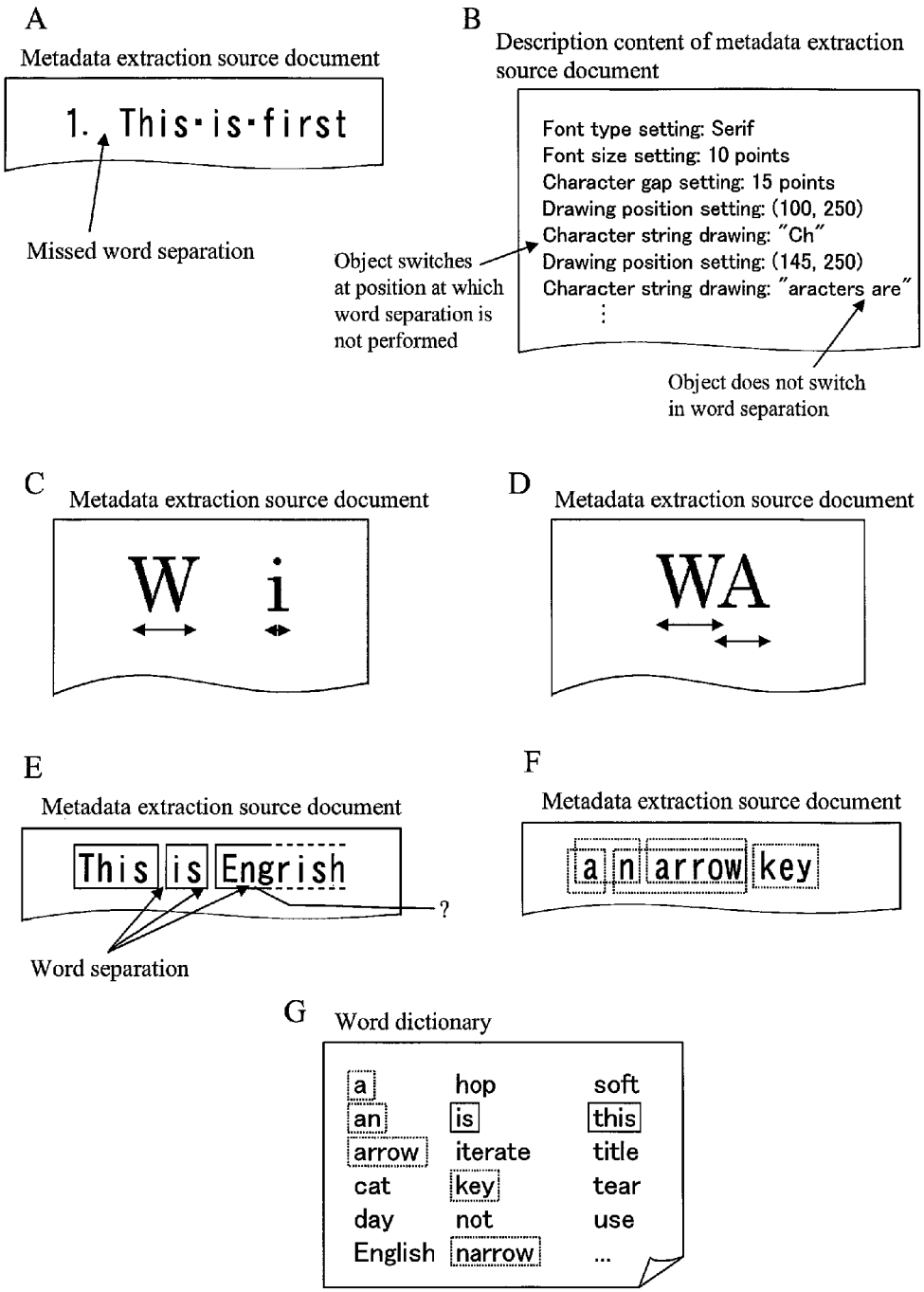
FIG. 4 is a diagram illustrating an example of a document in which "word separation" cannot be accurately checked by the intuitive method illustrated in FIG. 3.

In the following, an embodiment of the present invention will be explained with reference to the accompanying drawings. However, it should be noted that the present embodiment is just an example to realize the present invention and does not limit a technical range of the present invention. Also, the same reference numerals are assigned to common components in the figures. Also, in the following, although the embodiment of the present invention will be explained using a document created in English as an example, it is applicable to a document created in other languages than English (excluding languages such as Japanese, Chinese and Korean and including languages such as French, German, Italian and Russian) in which there is a space character in the separation of words forming a document.

<Introduction>
(1) It is assumed that, at the time of reinserting a space character in extracted metadata, it is possible to intuitively check "word separation" from a source document by the following methods.

i) Intuitive Method 1 to Check "Word Separation" from Source Document

Since there are space characters in a plain text or a source document created by an editing application such as Word, the positions of the space characters are held as data, and as illustrated in FIG. 3A, the positions in which the space characters are present in the source document are processed as "word separation."

ii) Intuitive Method 2 to Check "Word Separation" from Source Document

In a saving format of Office word-processing software, a saving format of browsing software or a printing data file, document description content is held in the form of character string objects (a character string object includes one or multiple characters). Therefore, with reference to a data structure of the source document, as illustrated in FIG. 3B, the timing at which an object holding a character or characters changes, is processed as "word separation."

iii) Intuitive Method 3 to Check "Word Separation" from Source Document

As illustrated in FIG. 3C, places at which character positions are separated from each other are processed as "word separation."

iv) Intuitive Method 4 to Check "Word Separation" from Source Document

As illustrated in FIGS. 3D and 3E, a word dictionary is prepared to perform matching with a word string, and the boundary of words registered in the dictionary is processed as "word separation."

However, actually, it is not possible to accurately check the word separation by any of the above methods.

For example, in a saving format of software specialized for the purpose of browse and save, PDF-converted data or a file format such as a printing data file, it is only necessary to reproduce only a document appearance. Therefore, it is possible to express the separation of English words only by separating character positions and drawing them, and it is not necessary to necessarily hold a space character as data. As illustrated in FIG. 4A, since even word separation does not hold a space character on the document file, it may not be possible to perform an accurate check by the above method 1.

Also, as illustrated in FIG. 4B, since there is a case where an object is not provided in a word unit, it may not be possible to perform an accurate check by the above method 2.

Further, there are cases where a proportional font is used and characters are not arranged at regular intervals as illustrated in FIG. 4C and where kerning is performed and a character gap varies as illustrated in FIG. 4D, and therefore, it may not be possible to perform an accurate check by the above method 3.

Also, there are cases where there is a word that is not registered in a dictionary as illustrated in FIG. 4E and where there are multiple matching possibilities as illustrated in FIGS. 4F and 4G, and therefore, it may not be possible to perform an accurate check by the above method 4.

(2) Therefore, the inventor focused on the fact that, according to an English writing rule, it is possible to decide whether adjacent characters as illustrated in Table 1 are included in the same word. It is important to perform processing of deciding whether the characters are included in the same word at the beginning, according to this writing rule. Also, in a case where it is not possible to decide whether they are included in the same word even if the processing is performed according to the writing rule, as described below, it is decided whether a space character is inserted in source document data, they are included in the same character string object and there is a gap between character string objects. Here, the writing rule denotes a rule defining a normative style to create a document, such as the Oxford rule and the Chicago manual.

TABLE 1

Example in which whether characters are included in the same word can be decided according to an English writing rule

| Item Number | Previous Character | Subsequent Character | Word | Example (Corresponding Area is underlined) |
|---|---|---|---|---|
| 1 | comma | English character | different | Japan, Co., Ltd. |
| 2 | English character, digit, period | comma | same | Japan, Co., Ltd. |
| 3 | English character | period | same | Japan, Co., Ltd. |
| 4 | colon | English character | different | From: Toshiko Matsumoto |
| 5 | English character, digit | colon | same | From: Toshiko Matsumoto |
| 6 | semicolon | English character, digit | different | . . . of RFID; makes shipping more accurate . . . |
| 7 | English character, digit | semicolon | same | . . . of RFID; makes shipping more accurate . . . |
| 8 | question mark | English character, digit | different | . . . How you received it? I have been . . . |
| 9 | English character, digit | question mark | same | . . . How you received it? I have been . . . |
| 10 | colon | slash | same | http://www.hitachisoft.jp |
| 11 | opened bracket | English character, digit | same | . . . SaaS (Software as a Service) businesses . . . |
| 12 | closed bracket | English character, digit | different | . . . SaaS (Software as a Service) businesses . . . |
| 13 | English character, digit, period | opened bracket | different | . . . SaaS (Software as a Service) businesses . . . |
| 14 | English character, digit | closed bracket | same | . . . SaaS (Software as a Service) businesses . . . |
| 15 | opened quote | English character, digit | same | . . . the "social innovation business" that fuses . . . |
| 16 | closed quote | English character, digit | different | . . . the "social innovation business" that fuses . . . |
| 17 | English character, digit | opened quote | different | . . . the "social innovation business" that fuses . . . |
| 18 | English character, digit | closed quote | same | . . . the "social innovation business" that fuses . . . |

Also, as a result of investigating a sample file, the inventor focused on the fact that, in a case where it is not possible to decide from the English writing rule whether the characters are included in the same word, it is possible to decide that characters between which a space character is inserted are included in different words.

Further, as a result of investigating a sample file, the inventor focused on the fact that, in a case where: it is not possible to decide from the English writing rule whether the characters are included in the same word; and where a space character is not inserted, it is possible to decide that characters included in the same character string object are included in the same word.

Also, as a result of investigating a sample file, the inventor focused on the fact that, in a case where: it is not possible to decide from the English writing rule whether the characters are included in the same word; a space character is not inserted; and they are included in different character string objects, it is possible to decide that they are included in different words if there is a gap between character string objects, and it is possible to decide that they are included in the same word if they are close to each other.

A business document processing device according to an embodiment of the present invention, which performs processing based on the above focus points, will be explained.

<Device Configuration>

Figure 5:
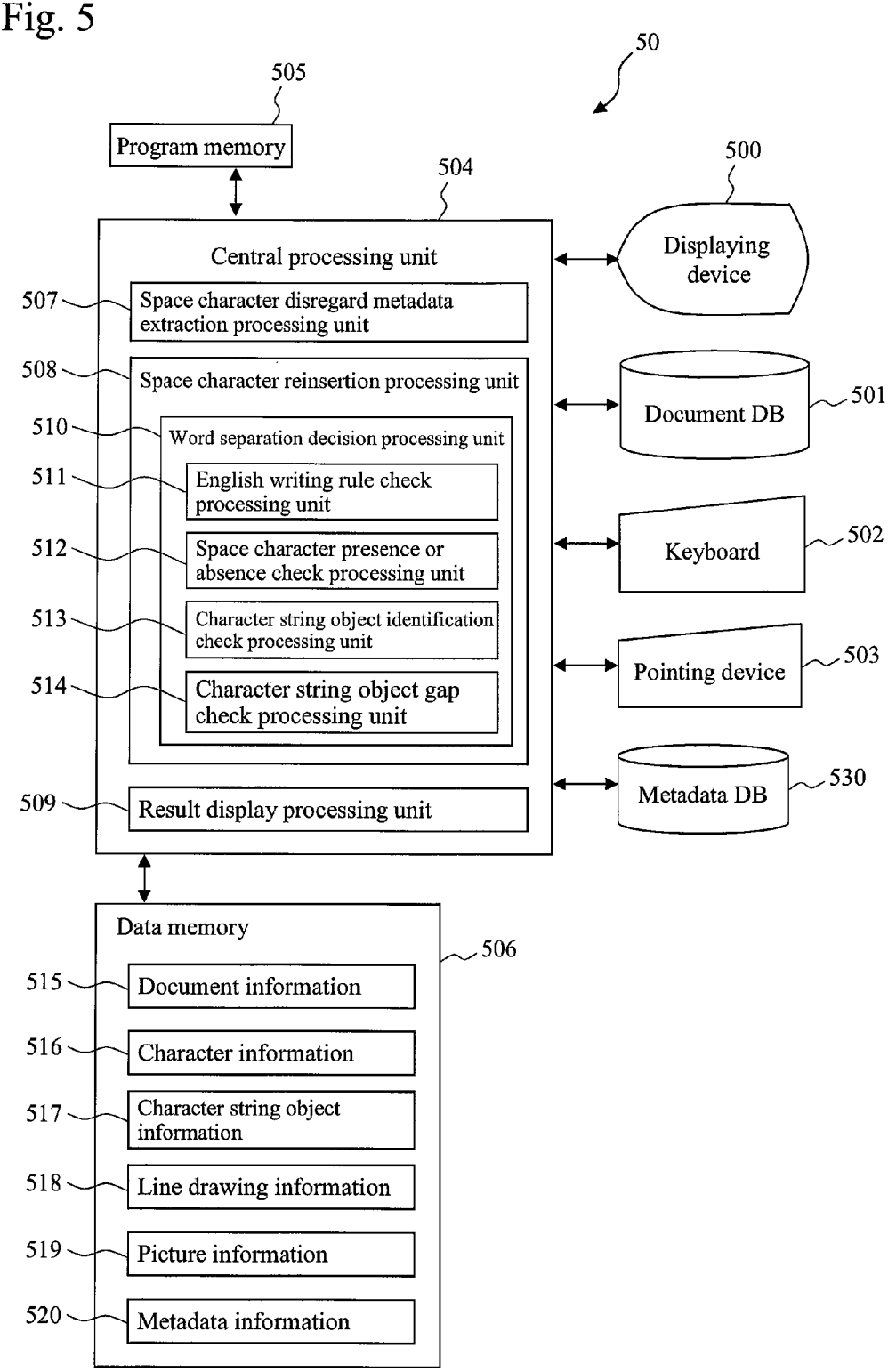
FIG. 5 is a functional block diagram illustrating a schematic configuration of a business document processing device according to an embodiment of the present invention.

FIG. 5 is a functional block diagram illustrating a schematic configuration of a business document processing device (or document processing device) according to the present embodiment. A business document processing device 50 includes a displaying device 500 to display data, a document DB 501, a keyboard 502 to perform an operation such as menu selection on the displayed data, a pointing device 503 such as a mouse, a central processing unit 504 to perform essential computation processing and control processing, a program memory 505 to store a program required for the processing in the central processing unit 504, a data memory 506 to store data required for the processing in the central processing unit 504, and a metadata DB 530 to store metadata that is a processing result of a character string object.

The central processing unit 504 includes a space character disregard metadata extraction processing unit 507 that performs processing of extracting metadata from a document in disregard of space characters, a space character reinsertion processing unit 508 that performs processing of reinserting a space character in the metadata extracted in disregard of space characters, and a result display processing unit 509 that displays the metadata subjected to the space insertion processing. In the present embodiment, each processing unit is realized by at least a part of the computer structure. That is, the space character disregard metadata extraction processing unit 507, the space character reinsertion processing unit 508 and the result display processing unit 509 are realized as part of functions of programs executed on the computer. Therefore, each processing unit can be read as each processing program. These programs are stored in the program memory 505. It should be noted that each processing unit may be realized by modularization.

The space character reinsertion processing unit 508 includes a word separation decision processing unit 510. Also, the word separation decision processing unit 510 includes an English writing rule check processing unit 511 that performs processing of checking, with reference to the wring rule in Table 1, whether there is a space character in a character string, a space character presence or absence check processing unit 512 that perform processing of checking with reference to document information 515, character information 516 and character string object information 517, whether there is a space character string, a character string object identification check processing unit 513 that performs processing of checking, with reference to character string object information 517, whether the identical objects are included, and a character string object gap check processing unit 514 that performs processing of checking a gap (i.e., pixel number) between two character string objects from coordinate information of the character string objects.

The data memory 506 stores the document information 515, the character information 516, the character string object information 517, line drawing information 518, picture information 519 and metadata information 520.

<Data Structure Example of Information in Data Memory>

FIG. 6 is a diagram illustrating a data structure example of the document information 515, the character information 516 and the character string object information 517.

The document information 515 includes a document ID 600, character data 601, character string object data 602, line drawing data 603 and picture data 604 as structure items. Here, the character data 601 denotes information of characters described in a document and is held in the form of an array of a character information structure. The character string object data 602 denotes information of character string objects including the characters described in the document and is held in the form of an array of a character string object information structure. The line drawing data 603 denotes information of line drawings (or line segments) described in a page and is held in the form of an array of a line drawing information structure. The picture data 604 denotes information of pictures described in a page and is held in the form of an array of a picture information structure.

The character information 516 includes a character ID 605, a character code 606, a character string object ID 607, lower left coordinates 608, upper right coordinates 609, a font size 610 and a font type 611. Here, the character ID 605 denotes the ID that is uniquely assigned to each character. The character code 606 indicates content of the character. The character string object ID 607 denotes an ID 612 of a character string object including the character. The lower left coordinates 608 denote coordinates indicating that in which position in a page, the lower left vertex of character's bounding rectangle is located. The upper right coordinates 609 denote coordinates indicating that in which position in the page, the upper right vertex of character's bounding rectangle is located. The font size 610 denotes the size of the character. The font type 611 denotes the font type of the character.

The character string object information 517 includes the character ID 612, a lower left coordinate 613 and an upper right coordinate 614 as structure items. Here, the character ID 612 denotes the ID that is uniquely assigned to each character string object. The lower left coordinate 613 denotes coordinates indicating that in which position in a page, the lower left vertex of the bounding rectangle of a character string is located. The upper right coordinate 614 denotes coordinates indicating that in which position in the page, the upper right vertex of the bounding rectangle of the character string is located.

FIG. 7 is a diagram illustrating data structures of line drawing information 518, the picture information 519 and the metadata information 520 included in the data memory 506.

The line drawing information 518 denotes information related to, for example, ruled lines, and includes a line drawing ID 700, starting coordinates 701 and ending coordinates 702 as structure items. Here, the line drawing ID 700 denotes the ID that is uniquely assigned to each line drawing. The starting coordinates 701 denote coordinates indicating that in which position in a page, one end of a straight line is located. The ending coordinates 702 denote a coordinate indicating that in which position in the page, the other end of the straight line is located.

The picture information 519 denotes information related to a seal face picture of a seal or illustration, and includes a picture ID 703, lower left coordinates 704, upper right coordinates 705 and pixel data 706 as structure items. Here, the picture ID 703 is the ID that is uniquely assigned to each picture. The lower left coordinates 704 denote coordinates indicating that in which position in a page the lower left vertex of the bounding rectangle of a picture is located. The upper right coordinates 705 denote coordinates indicating that in which position in the page, the upper right vertex of the bounding rectangle of the picture is located. The pixel data 706 holds a picture image in a picture format.

The metadata information 520 denotes a data structure to hold metadata of a document and includes a metadata ID 707, a metadata type 708, character data 709 and a space character reinsertion flag 710 as structure items. Here, the metadata ID 707 denotes the ID that is uniquely assigned to each metadata. The metadata type 708 holds information as to which metadata type is provided. The character data 709 holds the character ID 605 of each of characters included in the metadata, in the form of an array. The space character reinsertion flag 710 holds information as to whether to reinsert a space character in the character data 709 based on a result of reinsertion processing, in the form of an array.

<Outline of Metadata Extraction Processing>

Figure 8:
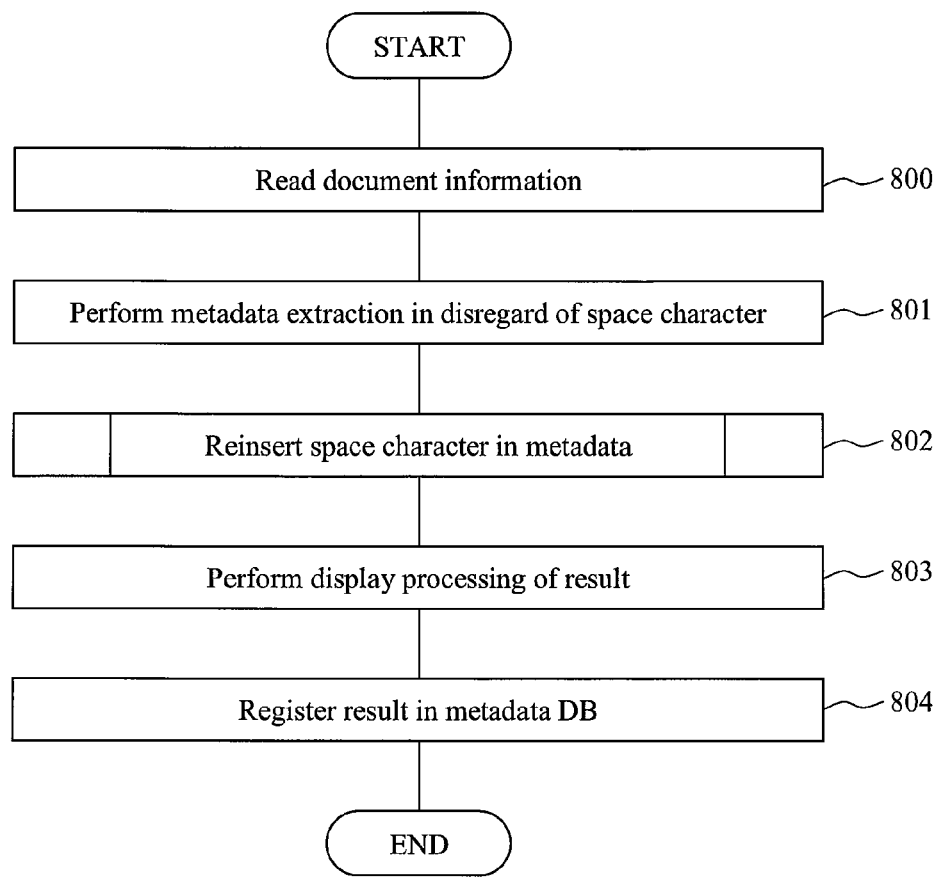
FIG. 8 is a flowchart for explaining the whole processing performed in a business document processing device.

Subsequently, processing performed in the business document processing device of the present embodiment configured as above will be explained. FIG. 8 is a flowchart for explaining an outline of metadata extraction/registration processing performed in the business document processing device.

In FIG. 8, first, reading processing of character information is performed using an OCR or the like (step 800). The reading result is held in the document information 515. In this stage, metadata is not extracted yet, and therefore there is no element of the metadata information 520.

Next, the space character disregard metadata extraction processing unit 507 performs metadata extraction in disregard of space characters (step 801). This processing is performed using the space character disregard metadata extraction processing unit 507 and can be performed by the existing techniques disclosed in, for example, Non-Patent Literatures 1 and 2 and Patent Literatures 1, 2 and 3. Therefore, the specific explanation will be omitted. The result of the processing is stored in the metadata information 520. Space character reinsertion processing is not performed at this time, and therefore, the space character reinsertion processing unit 508 initializes all array elements of the space character reinsertion flag 710 (see FIG. 7) by "false."

Subsequently, the space character reinsertion processing unit 508 performs processing of reinserting a space character in the metadata (step 802). The details of this processing will be explained in detail using FIG. 9.

After that, the result display processing unit 509 displays the processing result on the displaying device 500 (Step 803). A screen example displayed here will be explained in detail using FIGS. 11 and 12.

Further, finally, in response to a user's instruction, a metadata registration processing unit (not illustrated) registers the metadata in which the space character is reinserted, in the metadata DB 530 as a processing result.

<Details of Reinsertion Processing of Space Character>

Figure 9:
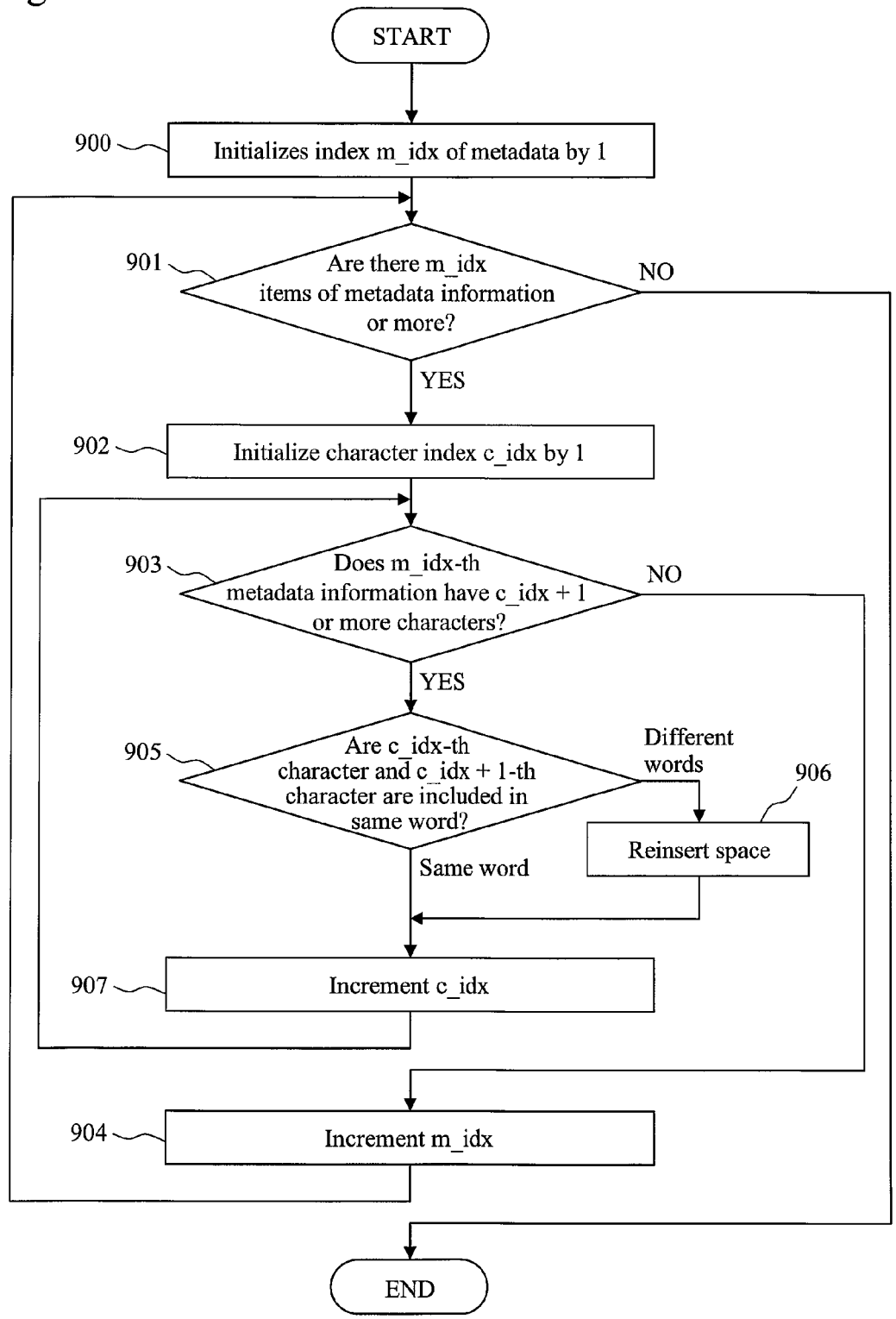
FIG. 9 is a flowchart for explaining specific operations performed in a space character reinsertion processing unit.

FIG. 9 is a flowchart for explaining details of processing (in step 802) of reinserting a space character in metadata in FIG. 8.

First, the space character reinsertion processing unit 508 initializes index m_idx of metadata by 1 (step 900) and checks whether the number of items of metadata information is equal to or greater than m_idx (step 901). In a case where it is less than m_idx, the processing is finished. Meanwhile, in a case where it is equal to or greater than m_idx, the space character reinsertion processing unit 508 initializes character index c_idx by 1 (step 902) and checks whether m_idx-th metadata information has c_idx+1 or more characters as the character data 709 (step 903). In a case where it is less than c_idx, since processing for all adjacent characters included in the metadata is finished, the space character reinsertion processing unit 508 increments m_idx by 1 (step 904) and returns the processing to step 901.

In step 903, in a case where it is equal to or greater than c_idx+1, the space character reinsertion processing unit 508 checks whether the c_idx-th character and the c_idx+1-th character are included in the same word (step 905). This processing is performed in the word separation decision processing unit 510 and will be explained in detail in FIG. 10.

As a result of step 905, when it is decided that they are included in different words, the space character reinsertion processing unit 508 sets the c_idx element of the space character reinsertion flag 710 of the metadata information to "true" (step 906). After that, the space character reinsertion processing unit 508 increments c_idx by 1 (step 907) and returns the processing to step 903.

<Decision Processing as to Whether They are Included in Same Word>

Figure 10:
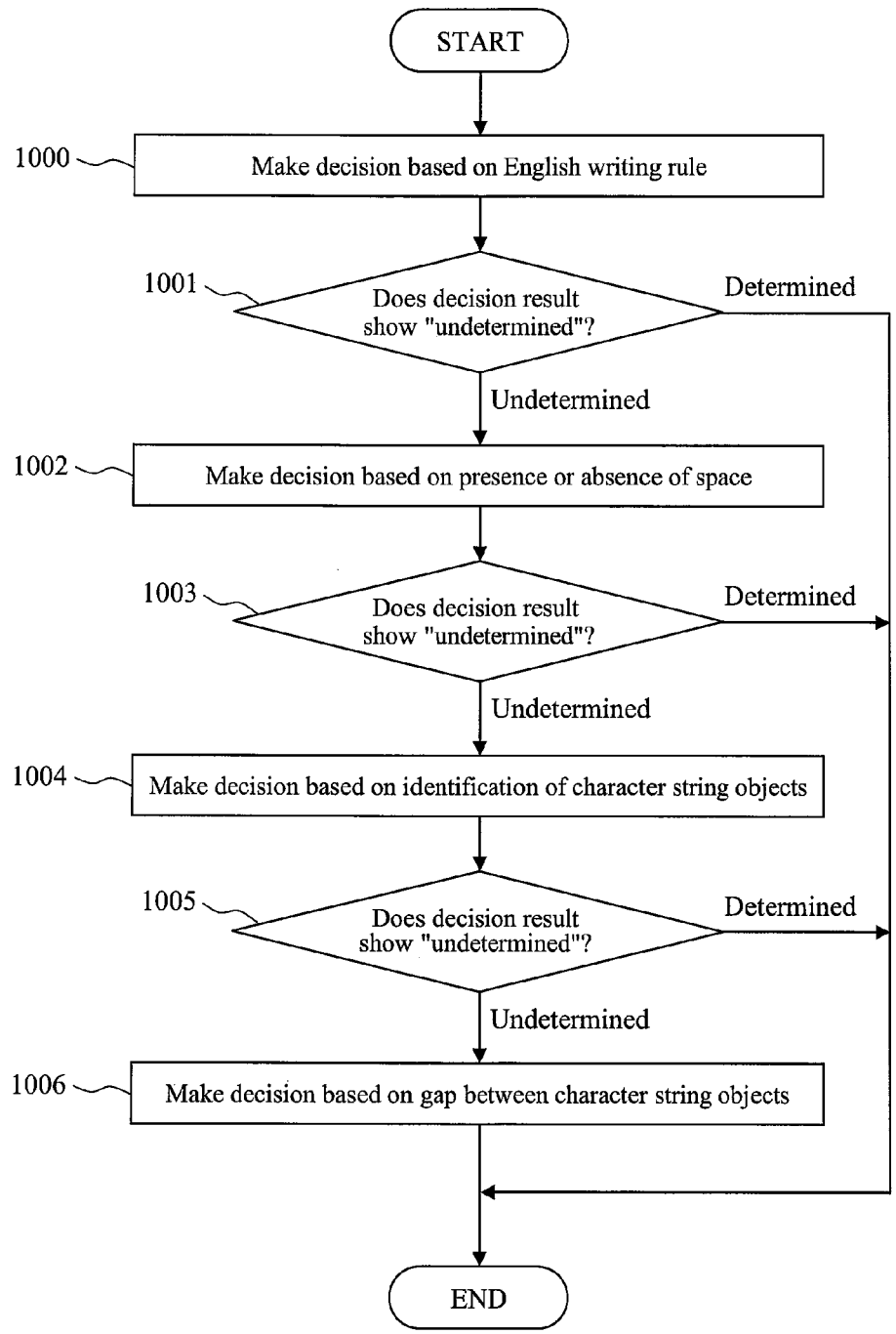
FIG. 10 is a flowchart for explaining specific operations performed in a word separation decision processing unit.

FIG. 10 is a flowchart for explaining details of the processing (in step 905) of deciding whether two characters are included in the same word in FIG. 9.

First, the space character reinsertion processing unit 508 decides, with reference to the English writing rule, whether two characters are included in the same word, using the English writing rule check processing unit 511 (step 1000). To be more specific, it is assumed that, when there is a corresponding item (rule) in Table 1 as a relationship of the two characters, the English writing rule check processing unit 511 can make a determination according to the rule and cannot make a determination if there is no corresponding item.

In a case where it is decided that the determination is not possible (step 1001), the space character reinsertion processing unit 508 makes a decision based on whether there is a space, using the space character presence or absence check processing unit 512 (step 1002). To be more specific, for each of the character data 601 included in character information, the space character presence or absence check processing unit 512 checks, with reference to the character code 606, whether it is a space character, and checks, with reference to the lower left coordinates 608 and the upper right coordinates 609, whether there is an insertion between the two characters. If it is found that a space character is inserted, it is decided that the two characters are included in different character strings, and, without such a character, it is not possible to make a determination.

In a case where it is decided that the determination is not possible (step 1003), the space character reinsertion processing unit 508 makes a decision based on the identification of character string objects, using the character string object identification check processing unit 513 (step 1004). To be more specific, the character string object identification check processing unit 513 checks whether the character string object IDs 607 of the two characters are identical. If they are identical, it is decided that the two characters are included in the same character string, and if they are different, it is decided that the determination is not possible.

In a case where the determination is not possible (step 1005), the space character reinsertion processing unit 508 makes a decision based on a gap between character string objects, using the character string object gap check processing unit 514 (step 1006). To be more specific, the character string object gap check processing unit 514 searches character string object information having the character string IDs 612 of the same values as the character string object IDs 607 of the two characters, and checks a gap from the lower left coordinates 613 and the upper right coordinates 614. For example, it may be decided that they belong to different character strings if the gap is equal to or greater than a predetermined value, and they belong to the same character string if they are close to each other (i.e., less than the predetermined value).

As described above, first, processing based on the writing rule is performed, and if it is not possible to make a decision, the space character presence or absence check processing, the character string object identification check processing and the character string object gap check processing are performed in order. The decision based on the writing rule is performed first because it is possible to accurately decide word separation in various documents. For example, in the case of document description content as illustrated in FIG. 4B, if it is decided first "whether adjacent characters are included in the same character string object" (using the character string object identification check processing), since the last letter, "s," of the word "Characters" and the first letter, "a," of the word "are" are included in the same character string object, it is erroneously decided that they are included in the same word. Also, by deciding, first, "whether a space character is inserted" (using the space character presence or absence check processing), and only when the space character is not inserted, deciding "whether adjacent characters are included in the same character string object" (using the character string object identification check processing) in order, it is possible to prevent such a mistaken decision and accurately make a decision.

<Result Display Screen Example>

Figure 11:
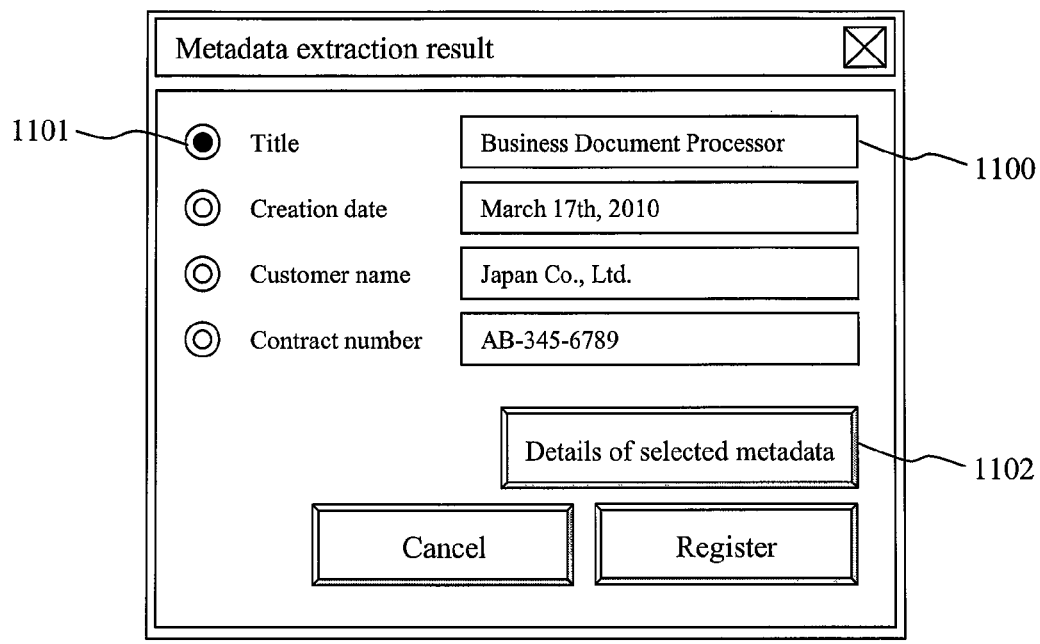
FIG. 11 is a diagram illustrating a confirmation screen example displayed by a result display processing unit.
Figure 12:
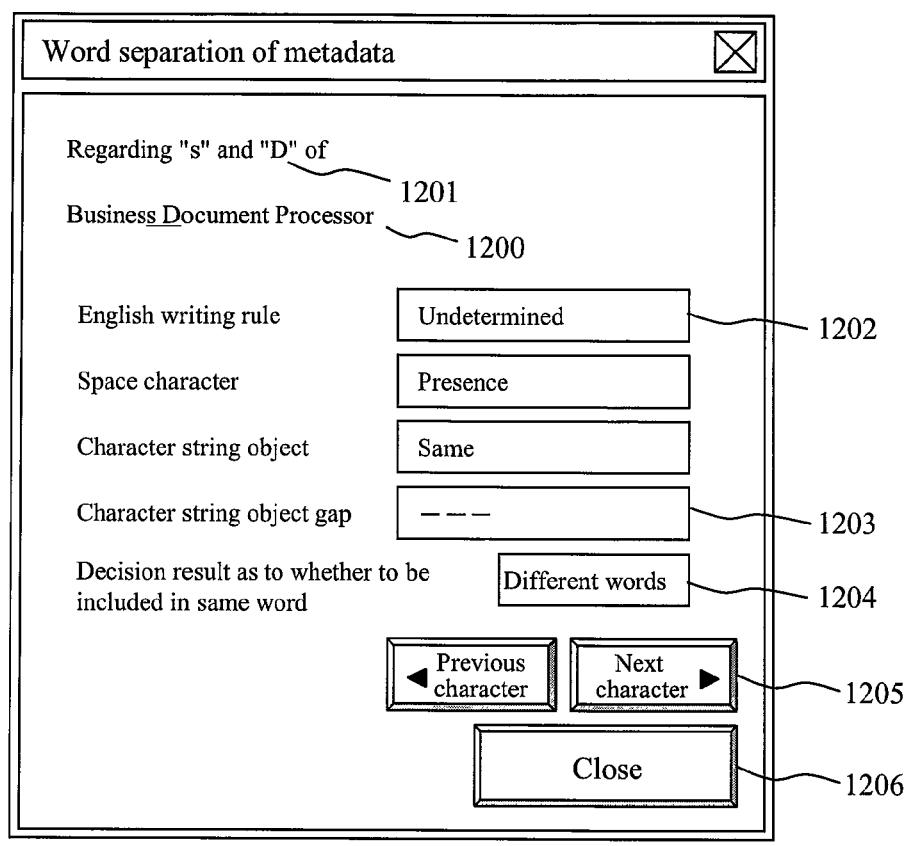
FIG. 12 is a diagram illustrating a confirmation screen example displayed by a result display processing unit.

FIGS. 11 and 12 are diagrams illustrating screen examples in which the results of the display processing (step 803) in FIG. 8 are displayed.

In FIG. 11, content held in the metadata information 520 is arranged and displayed (1100). Here, by connecting the content of the character data 709 or inserting a space character in the content based on the result of the space character reinsertion flag 710, it is arranged and displayed in a state where words are separated by a space character. Here, regarding selected metadata (1101), when a user operation to request a display of specific information as to word separation is performed (i.e., button 1102 is pressed), the screen illustrated in FIG. 12 is displayed.

In FIG. 12, a metadata character string is displayed, and focused adjacent characters are highlighted by underline (1200). Also, only the focused adjacent characters are extracted and displayed (1201). For these characters, the results decided in the flowchart processing in FIG. 10 are displayed (1202). In the processing in FIG. 10, if the decision succeeds, since subsequent processing is not performed, this information (indicated by "- - -" in the figure) is displayed for a part on which the processing is not performed (1203). Also, the final decision result in the processing in FIG. 10 is displayed (1204). A user operation to request a change of focused adjacent characters is accepted (1205) and displays 1200 to 1204 are updated. It should be noted that, if a close button 1206 is pressed, the screen in FIG. 12 is switched to the screen in FIG. 11.

<Variation Example>

It should be noted that the present specification describes a case where output is performed in which metadata of a document is separated by a space character for every word. The same applies to processing to perform output in which the whole text data of an English document is separated by a space for every word.

Also, regarding character information, in addition to the case of FIG. 6, it is possible to hold various format specification information such as a character outer color (RGB component), character-filled color (RGB component), italic face, bold face and character background color (RGB component). Even in this case, it is possible to perform metadata extraction processing in disregard of space characters by the existing techniques disclosed in Non-Patent Literatures 1 and 2 and Patent Literatures 1, 2 and 3, and therefore, this case can be processed in the same way as the case described in the present specification.

Also, regarding line drawings, although the present specification describes the case of line segments, a case is possible where a document includes a rectangle, polygon, Bezier curve, arc or a combination of these. Further, it may be possible to hold various format specification information such as a line color, thickness, pattern (e.g., solid line or dotted line) and filling color. Even in this case, it is possible to perform metadata extraction processing in disregard of space characters by the existing techniques disclosed in Non-Patent Literatures 1 and 2 and Patent Literatures 1, 2 and 3, and therefore, this case can be processed in the same way as the case described in the present specification.

Also, although the present specification describes an example of highlight by underlining in FIG. 12, the form of highlight is not limited to this. Highlight by bold face or character color is possible.

SUMMARY

A feature of the embodiment of the present invention lies in deciding whether two adjacent characters in an English document are included in the same word, using the English writing rule. Here, the writing rule denotes a rule defining a normative style to create a document, such as the Oxford rule and the Chicago manual. By this means, it is possible to decide presence or absence of space based on the writing method unique to English. It should be noted that, although the present embodiment gives an explanation using English as an example, the present invention is applicable to any language as long as it is a language in which the writing method is unique and there is a space character between words.

Also, in a case where it is not possible to determine whether there is a space even if a decision is made according to the writing rule, it is decided whether two adjacent characters in an English document are included in the same word, based on source document information as to whether a space character is inserted between two characters (i.e., information about space characters included in read document data). Also, in a case where it is not possible to make a definite decision as to the presence or absence of space even if a decision is made based on the source document information, it is decided whether two adjacent characters in an English document are included in the same word, based on character string object information as to whether the characters are included in the same character string object. Further, in a case where it is not possible to make a definite decision as to the presence or absence of space even if a decision is made based on character string object information, it is decided whether two adjacent characters in an English document are included in the same word, based on information as to whether character string objects have a gap or they are close to each other (i.e., information as to how far a distance between characters is, which is decided from the coordinate information held by each pieces of character information). Thus, only when it is not possible to determine by the writing rule whether there is a space, by deciding by other methods whether there is a space character or making a decision as to space in such an order, it is possible to make a more accurate decision as to whether there is a space. That is, as described above, if a decision is made first using information as to "whether adjacent characters are included in the same character string object," for example, since the last letter, "s," of word "Characters" and the first letter, "a," of word "are" are included in the same character string object, it is erroneously decided that they are included in the same word. Therefore, by making a decision first using information as to "whether a space character is inserted," and only when the space character is not inserted, making a decision using information as to "whether adjacent characters are included in the same character string object" in order, it is possible to prevent such a mistaken decision and accurately make a decision.

It should be noted that the present invention can be realized by a program code of software to realize functions of the embodiment. In this case, a storage medium recording the program code is provided to a system or device, and a computer (or CPU or MPU) of the system or device reads the program code stored in the storage medium. In this case, the program code itself read from the storage medium realizes the functions of the above embodiment, and the program code itself and the storage medium storing it form the present invention. Examples of the storage medium to provide such a program code include a flexible disc, a CD-ROM, a DVD-ROM, a hard disk, an optical disc, a magneto-optical disc, a CD-R, a magnetic tape, a non-volatile memory card and a ROM.

Also, based on an instruction of a program code, for example, an OS (Operating System) operating on a computer may perform part or all of actual processing and realize the functions of the above embodiment by the processing. Further, after a program code read from a storage medium is written in a memory on a computer, based on an instruction of the program code, for example, a CPU of the computer may perform part or all of actual processing and realize the functions of the above embodiment by the processing.

Also, by distributing a program code of software to realize the functions of the embodiment via a network, the program code may be stored in a storage unit such as a hard disk and a memory of a system or device or in a storage medium such as a CD-RW and a CD-R, and at the time of use, a computer (or CPU or MPU) of the system or device may read and perform the program code stored in the storage unit or the storage medium.

REFERENCE SIGNS LIST

500 Displaying device
501 Document DB
502 Keyboard
503 Pointing device
504 Central processing unit
505 Program memory
506 Data memory
530 Metadata DB

The invention claimed is:

1. A document processing device that performs predetermined processing on a document including text created in a language, in which a space character is provided as word separation, and manages a processing result, the device comprising:
a registration database that registers the processing result;
a document database that stores source document information acquired by reading a source document including a word forming the text and information about presence or absence of a space character;
a metadata extraction processing unit that performs processing of extracting metadata from the text in disregard of the space character;
a word separation decision processing unit that decides whether two adjacent characters included in the text are included in a same word, based on a writing rule between a character or a word and a symbol in the text;
a display processing unit that displays a processing result in the word separation decision processing unit on a displaying device; and
a registration processing unit that registers a processing result in the word separation decision processing unit, in the registration database in response to an input instruction, wherein
the word separation decision processing unit reinserts the space character in the extracted metadata using the decision result as to whether the two adjacent characters are included in a same word, and
the registration processing unit registers the metadata in which the space character is reinserted, in the registration database as a processing result in the word separation decision processing unit.

2. The document processing device according to claim 1, wherein,
when it is not possible to determine by decision processing based on the writing rule that the two adjacent characters are included in a same word, the word separation decision processing unit refers to the source document information to check whether a space character is inserted between the two adjacent characters, and based on the result of the check, decides whether the two adjacent characters in the text are included in a same word.

3. The document processing device according to claim 2, further comprising:
a memory that stores character string object information including an identifier of a character string and a feature of the character string object, and character information indicating in which character string each character of the character string is included, wherein
when it is not possible to determine that the two adjacent characters are included in a same word even if the source document information is referred to, the word separation decision processing unit refers to the character string object information and the character information to check whether the two adjacent characters are included in a same character string object, and based on the result of the check, decides whether the two adjacent characters in the text are included in a same word.

4. The document processing device according to claim 3, wherein
the character string object information further comprises positional information of each character string; and
when it is not possible to determine that the two adjacent characters are included in a same word even if the character string object information and the character information are referred to, the word separation decision processing unit refers to the positional information of each character string to check whether the character string objects have a gap or the character string objects are close to each other, and based on the result of the check, decides whether the two adjacent characters in the text are included in a same word.

5. A non-transitory computer readable storage medium which stores a program that causes a computer to function as a document processing device that performs predetermined processing on a document including text created in a language, in which a space character is provided as word separation, and manages a processing result, the program comprising:

a program code that causes the computer to perform word separation decision processing for deciding whether two adjacent characters included in the text are included in a same word, based on a writing rule between a character or a word and a symbol in the text;

a program code that causes a displaying device to display a result of the word separation decision processing; and a program code that causes the computer to register the result of the word separation decision processing in a registration database in response to an input instruction, wherein the computer is connected to a document database that stores source document information acquired by reading a source document including a word forming the text and information about presence or absence of a space character, the program further comprises a program code that causes the computer to perform processing of extracting metadata from the text in disregard of the space character, the program code to perform the word separation decision processing comprises a program code that causes the computer to perform processing of reinserting the space character in the extracted metadata using the decision result as to whether the two adjacent characters are included in a same word, and the program code for registration database comprises a program code that causes the computer to register the metadata in which the space character is reinserted, in the registration database as a processing result in the word separation decision processing.

6. The non-transitory computer readable storage medium according to claim 5, wherein the program code to perform the word separation decision processing comprises a program code that causes the computer to perform processing of, when it is not possible to determine by decision processing based on the writing rule that the two adjacent characters are included in a same word, referring to the source document information to check whether a space character is inserted between the two adjacent characters, and based on the result of the check, deciding whether the two adjacent characters in the text are included in a same word.

7. The non-transitory computer readable storage medium according to claim 6, wherein the computer further comprises a memory that stores character string object information including an identifier of a character string and a feature of the character string object, and character information indicating in which character string each character of the character string is included; and the program code to perform the word separation decision processing comprises a program code that causes the computer to perform processing of, when it is not possible to determine that the two adjacent characters are included in a same word even if the source document information is referred to, referring to the character string object information and the character information to check whether the two adjacent characters are included in a same character string object, and based on the result of the check, deciding whether the two adjacent characters in the text are included in a same word.

8. The non-transitory computer readable storage medium according to claim 7, wherein the character string object information further comprises positional information of each character string; and the program code to perform the word separation decision processing causes the computer to perform processing of, when it is not possible to determine that the two adjacent characters are included in a same word even if the character string object information and the character information are referred to, referring to the positional information of each character string to check whether the character string objects have a gap or the character string objects are close to each other, and based on the result of the check, deciding whether the two adjacent characters in the text are included in a same word.

9. A document processing device that performs predetermined processing on a document including text created in a language, in which a space character is provided as word separation, and manages a processing result, the device comprising:

a processor; and computer-readable storage media which store:

a registration database that registers the processing result, and a document database that stores source document information acquired by reading a source document including a word forming the text and information about presence or absence of a space character, the computer-readable storage media encoded with instructions that, when executed on the processor, instruct the processor to provide:

a metadata extraction processing unit that performs processing of extracting metadata from the text in disregard of the space character;

a word separation decision processing unit that decides whether two adjacent characters included in the text are included in a same word, based on a writing rule between a character or a word and a symbol in the text;

a display processing unit that displays a processing result in the word separation decision processing unit on a displaying device; and a registration processing unit that registers a processing result in the word separation decision processing unit, in the registration database in response to an input instruction, wherein the word separation decision processing unit reinserts the space character in the extracted metadata using the decision result as to whether the two adjacent characters are included in a same word, and the registration processing unit registers the metadata in which the space character is reinserted, in the registration database as a processing result in the word separation decision processing unit.

10. The document processing device according to claim 9, wherein, when it is not possible to determine by decision processing based on the writing rule that the two adjacent characters are included in a same word, the word separation decision processing unit refers to the source document information to check whether a space character is inserted between the two adjacent characters, and based on the result of the check, decides whether the two adjacent characters in the text are included in a same word.

11. The document processing device according to claim 10, further comprising:

a memory that stores character string object information including an identifier of a character string and a feature of the character string object, and character information indicating in which character string each character of the character string is included, wherein when it is not possible to determine that the two adjacent characters are included in a same word even if the source document information is referred to, the word separation decision processing unit refers to the character string object information and the character information to check whether the two adjacent characters are included in a same character string object, and based on the result of the check, decides whether the two adjacent characters in the text are included in a same word.

12. The document processing device according to claim 11, wherein the character string object information further comprises positional information of each character string; and when it is not possible to determine that the two adjacent characters are included in a same word even if the character string object information and the character information are referred to, the word separation decision processing unit refers to the positional information of each character string to check whether the character string objects have a gap or the character string objects are close to each other, and based on the result of the check, decides whether the two adjacent characters in the text are included in a same word.

* * * * *